June 19, 1934.   J. E. PEYS   1,963,336
SOLDERING TOOL
Filed May 31, 1930
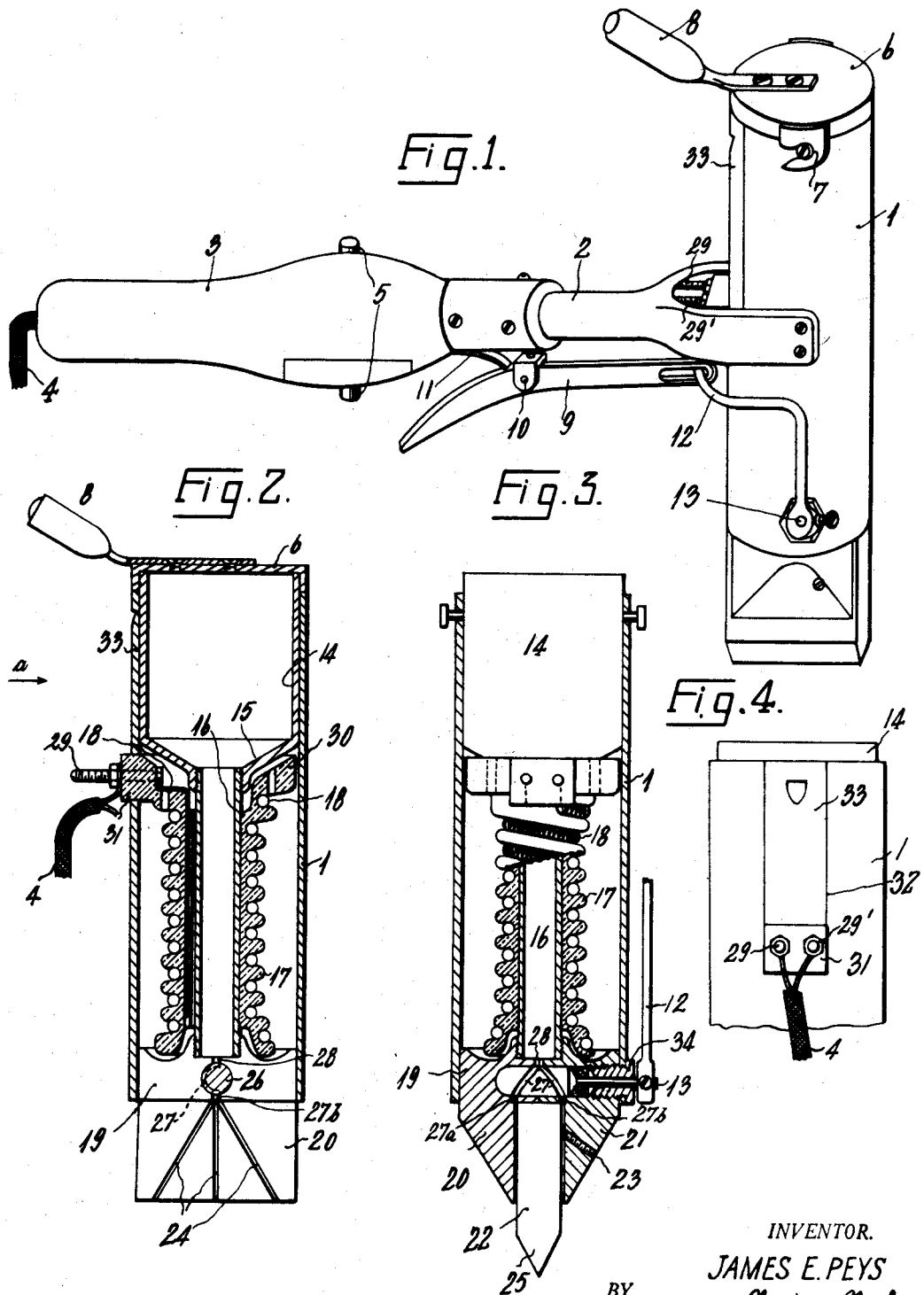
INVENTOR.
JAMES E. PEYS
BY Chapin & Neal
ATTORNEYS.

Patented June 19, 1934

1,963,336

UNITED STATES PATENT OFFICE 1,963,336

SOLDERING TOOL

James E. Peys, West Springfield, Mass.

Application May 31, 1930, Serial No. 457,982

7 Claims. (Cl. 219—27)

This invention relates to electrically heated soldering tools and has for its object improvements in construction and operation of such implements.

An important feature of the present invention resides in the means for feeding the molten solder uniformly and steadily over the working surface of the soldering iron, together with conveniently operated means for controlling said feed.

A further object of the invention is the provision of efficient means for melting within the tool a relatively large supply of solder so that when in molten condition the heat of the same will serve to maintain the temperature of the working point of the tool at a sufficiently steady heat for the continuous and satisfactory working of the same. A further object of the invention is to provide electric current control means on the tool whereby overheating of the tool and waste of current may be avoided. The present invention also provides means for detachably mounting the soldering or working member on the tool so that the same may be readily replaced when unserviceable.

Further objects of the invention are to provide a tool of the character described having a minimum number of component parts, to provide an unusually simple and rugged construction of such a tool and to provide a reliable and efficient tool at low cost of manufacture.

Referring to the drawing which shows a preferred embodiment of the invention:

Fig. 1 is a perspective view of the entire soldering tool;

Fig. 2 is a vertical section through the casing of the tool;

Fig. 3 is another vertical section of the same taken at right angles to Fig. 2; and Fig. 4 is a detail of the slotted side of casing 1 looking in the direction of arrow a in Fig. 2.

The tool comprises a cylindrical-like casing 1 supported upon a laterally extending handle 2 with a grip portion 3. 4 indicates a cable of electric current carrying wires leading through the handle and secured to terminal studs 29, 29' which extend into the casing of the tool, as shown in Fig. 2. 5 is a double ended push button of an electric circuit control switch whereby the heating current for the tool may be turned on or off as desired. The casing 1 may be provided with a suitable cover 6 hinged thereto or attached by bayonet joints, as shown at 7, and having a handle 8. 9 is an operating member or lever for the solder feed control valve of the tool, which valve will be hereinafter more particularly described. The lever 9 is pivoted at 10 on a bracket of the handle and its position is controlled by a spring 11 in such manner that it will stay in either of two set positions, one with the valve open and one with the valve closed. An angularly shaped crank arm 12 fixed to the end of the shaft 13 of the feed control valve is connected to the lever 9, as shown, for turning the valve when the lever 9 is operated.

Removably mounted and snugly fitted within the casing 1 is a relatively large solder receiving pot or chamber 14, and said pot has a cone shaped bottom 15 contracting to a depending tube or chamber portion 16 of reduced diameter and extending axially of the casing 1. Surrounding the reduced portion 16 of the chamber is an insulating sleeve or porcelain 17 having a spiral groove on its periphery to receive the electric current heating wire indicated at 18. The upper end 30 of the porcelain sleeve 16 is cup-shaped to receive and support the cone shaped base 15 of the pot 16 and the sleeve itself is supported within the casing 1 by a projecting boss 31 resting on the side wall of said casing at the bottom of a slot 32 therein. A removable slide piece 33 is fitted in said slot 32, as shown in Fig. 4, to retain the porcelain sleeve 6 in the casing. At the lower end of the casing 1 there is fixed a base closure or member 19, which is screw threaded to the lower end of the tubular portion 16. This member 19 is formed with spaced chuck jaws 20 and 21 which are adapted to receive therebetween the working member 22 or soldering iron. A soldering iron, although thus called in the trade, is generally made of copper. The soldering iron is detachably held in the jaws 20 and 21 by means of a set screw 23, and thus may be replaced when desired. Upon the inner face of each of the jaws 20 and 21 are formed grooved channels (as shown at 24 in Fig. 2) which diverge from the upper end toward the lower end of said jaw. These grooves 24 and the similar grooves on jaw 21, form, with the adjacent sides of the soldering iron 22, solder distributing ducts which lead the solder downwardly along the outer sides of said iron 22 toward its working point 25.

Extending transversely of the casing 1 and mounted within the base member 19 is a valve cock spindle 26 which is rotatable and has its outwardly extending shaft 13 connected to the arm 12, as heretofore described. The spindle 26 is retained in position by the gland plug 34 screw threaded through the side wall of casing 1 and into the base 19 and furnishing a bearing for the shaft 13. It will be noted also that the spindle 16 and its plug 34 serve to retain the base 19 in position relative to the casing 1. Upon the outer cylindrical surface of the spindle 26 there is formed diverging grooves 27, as shown in Fig. 3, which at their upper ends communicate with an aperture 28 at the bottom of the soldering chamber 16 and at their lower ends communicate through slots 27a and 27b in the base member 19 with the ducts 24 and the similar ducts upon the face of the jaw 21. The angular extent of the grooves 27 upon the surface of the spindle 26 is such that a very slight rotative movement of said spindle is sufficient to open or close the valve.

The provision of the solder distributing ducts 24 on the outside of the soldering iron 22 is found to give a steady and uniform feed for the solder upon the outside or working point of the iron 25 as well as to readily cover said working point 25 with solder and prevent the chance of oxidation thereof. Such soldering irons are usually made of copper and when heated tend to quickly form a scale when exposed to the atmosphere. It is therefore of great importance to keep the exposed working end of the tool covered with solder as far as possible. Also the arrangement of the distributing ducts 24 which terminate, as shown, above the working end 25 of the soldering iron tends to prevent the solder from forming into drops as it emerges from said ducts upon the surface of said member. In this way, the solder conducted to the working end of the tool tends to spread out over said surface and completely cover it, and provides both a proper working action for the point 25 as well as a protection against the formation of scale.

In using the present soldering tool, the solder to be melted is placed in the chamber 14 and the electric heat turned on to fuse it. An indication of the amount of heating necessary for the tool is afforded by the point at which the fused solder begins to run or feed to the working end 25. When this occurs, the current may be shut off and the tool worked with as long as solder will run, which will be a considerable length of time due to the maintenance of heat by the molten solder in the chamber 14, 16. As soon as the solder fails to run down to the working point of the member 25, the current may be again turned on to reheat the solder. In this way, a considerable saving of electrical current may be obtained by use of the present tool and the danger of over-heating the tool avoided.

It will be appreciated from the foregoing description that the several principal parts making up the complete tool are separable and removable for replacement and repair. The assembly of these parts into the tool may be accomplished as follows. The porcelain sleeve 17 with its heating wire 18 is first slid onto the tubular portion 16 and the base member 19 is screwed onto the bottom of the tubular portion. These parts are then inserted into the casing 1 from the top with the projection 31 in the slot 32; and the socket for the spindle 26 is registered with the plug opening at the bottom of casing 1. The slide 33 may then be fitted in place in the slot 32, the spindle 26 inserted and the plug 34 screwed home. Finally the work member 22 is fitted in place and held by screw 23, and the wires of cable 4 connected to the terminals 29, 29'. When filled with solder and the cover 6 is locked on, the tool is ready for use.

What I claim is:

1. In an electrically heated soldering tool, in combination, a casing providing a solder receiving chamber, electric heating means associated with said chamber to melt the solder therein, chuck jaws at the lower end of said casing, a soldering member secured in said jaws, the inner faces of said jaws being formed with grooves to provide solder distributing ducts leading down the outside of said soldering member, and a valve for controlling communication between the solder chamber and said solder distributing ducts.

2. In an electrically heated soldering tool, in combination, a casing providing a solder receiving chamber, electric heating means associated with said chamber to melt the solder therein, chuck jaws at the lower end of said casing, a soldering member secured in said jaws, the inner faces of said jaws being formed with grooves to provide solder distributing ducts leading down the outside of said soldering member, said ducts terminating at the sides of said soldering member and above the working point thereof, and a valve for controlling communication between the solder chamber and said solder distributing ducts.

3. In an electrically heated soldering tool, in combination, a casing providing a solder receiving chamber, electric heating means associated with said chamber to melt the solder therein, chuck jaws at the lower end of said casing, a soldering member secured in said jaws, the inner faces of said jaws being formed with grooves to provide solder distributing ducts leading down the outside of said soldering member, and a valve comprising a rotatable spindle formed with grooves upon its exterior surface to provide communicating ducts between the solder chamber and said solder distributing ducts.

4. In an electrically heated soldering tool, in combination, a casing providing a solder receiving chamber, electric heating means associated with said chamber to melt the solder therein, chuck jaws at the lower end of said casing, a soldering member secured in said jaws, the inner faces of said jaws being formed with grooves to provide solder distributing ducts leading down the outside of said soldering member, a valve for controlling communication between the solder receiving chamber and said solder distributing ducts, a handle supporting said casing, a valve operating member adjacent said handle, and a control switch for the electric heating means mounted on said handle.

5. In an electrically heated soldering tool, in combination, a casing, a solder receiving chamber with a depending portion of reduced diameter removably fitted in said casing, an insulating sleeve removably fitted on the reduced lower portion of said chamber and carrying an electric current heating wire, a base member detachably secured to said chamber depending portion, and fitting within the lower end of said casing to close the same, and a soldering member detachably fastened to said base member.

6. In an electrically heated soldering tool in combination, a hollow casing forming within the same a solder receiving chamber, electrical heating means associated with said chamber to melt the solder therein, said chamber having a solder outlet at its lower end, a holding member at the lower end of said chamber and a soldering member held within said holding member with the lower end of said soldering member exposed, one or more distributing ducts having communication with said chamber and formed between the adjacent side or sides of said holding member and said soldering member, said duct or ducts terminating on the exposed side of said soldering member at a distance above its lower end whereby the molten solder may be conducted from said chamber to said exposed side of said soldering member and run down the outside of the same to the point thereof.

7. In an electrically heated soldering tool in combination, a hollow casing forming within the same a solder receiving chamber, electrical heating means associated with said chamber to melt the solder therein, said chamber having a solder outlet at its lower end, a manually controlled valve for said chamber outlet, a holding member at the lower end of said chamber and a soldering member held within said holding member with the lower end of said soldering member exposed, one or more distributing ducts having communication with said chamber and formed between the adjacent side or sides of said holding member and said soldering member, said duct or ducts terminating on the exposed side of said soldering member at a distance above its lower end whereby the molten solder may be conducted from said chamber to said exposed side of said soldering member and run down the outside of the same to the point thereof.

JAMES E. PEYS.